United States Patent
Lee et al.

(10) Patent No.: US 12,472,629 B2
(45) Date of Patent: Nov. 18, 2025

(54) METHODS AND SYSTEMS FOR GRAPHICAL USER INTERFACES TO CONTROL REMOTELY LOCATED ROBOTS

(71) Applicant: Google LLC, Mountain View, CA (US)

(72) Inventors: Johnny Lee, Mountain View, CA (US); Stefan Welker, Mountain View, CA (US)

(73) Assignee: Google LLC, Mountain View, CA (US)

( * ) Notice: Subject to any disclaimer, the term of this patent is extended or adjusted under 35 U.S.C. 154(b) by 461 days.

(21) Appl. No.: 17/753,978

(22) PCT Filed: Nov. 19, 2019

(86) PCT No.: PCT/US2019/062188
§ 371 (c)(1),
(2) Date: Mar. 21, 2022

(87) PCT Pub. No.: WO2021/101522
PCT Pub. Date: May 27, 2021

(65) Prior Publication Data
US 2022/0355483 A1   Nov. 10, 2022

(51) Int. Cl.
*B25J 9/16* (2006.01)
*B25J 13/02* (2006.01)
*B25J 13/08* (2006.01)

(52) U.S. Cl.
CPC .......... *B25J 9/1671* (2013.01); *B25J 9/1666* (2013.01); *B25J 13/025* (2013.01); *B25J 13/087* (2013.01)

(58) Field of Classification Search
CPC ...... B25J 9/1671; B25J 9/1666; B25J 13/025; B25J 13/087; B25J 9/00; B25J 9/16;
(Continued)

(56) References Cited

U.S. PATENT DOCUMENTS

| 11,235,459 B2 * | 2/2022 | Dupuis | B25J 9/1664 |
| 2005/0149231 A1 * | 7/2005 | Pretlove | B25J 9/1671 |
| | | | 700/264 |

(Continued)

FOREIGN PATENT DOCUMENTS

| CN | 103213125 B | 5/2016 |
| DE | 202017106506 U1 | 4/2018 |
| WO | 2010117685 A2 | 10/2010 |

OTHER PUBLICATIONS

Kohlbrecher et al, "A Comprehensive Software Framework for Complex Locomotion and Manipulation Tasks Applicable to Different Types of Humanoid Robots," Jun. 7, 2016 (Year: 2016).*

(Continued)

*Primary Examiner* — Adam R Mott
*Assistant Examiner* — Byron Xavier Kasper
(74) *Attorney, Agent, or Firm* — McDonnell Boehnen Hulbert & Berghoff LLP

(57) ABSTRACT

An example method for providing a graphical user interface (GUI) of a computing device includes receiving an input indicating a target pose of the robot, providing for display on the GUI of the computing device a transparent representation of the robot as a preview of the target pose in combination with the textured model of the robot indicating the current state of the robot, generating a boundary illustration on the GUI representative of a limit of a range of motion of the robot, based on the target pose extending the robot beyond the boundary illustration, modifying characteristics of the transparent representation of the robot and of the boundary illustration on the GUI to inform of an invalid pose, and based on the target pose being a valid pose, sending instructions to the robot causing the robot to perform the target pose.

22 Claims, 9 Drawing Sheets

(58) Field of Classification Search
CPC .... B25J 9/1656; B25J 9/1692; B25J 11/0075; G05B 2219/40091; G05B 2219/40515; G06F 30/20
See application file for complete search history.

(56) References Cited

U.S. PATENT DOCUMENTS

| | | | | |
|---|---|---|---|---|
| 2008/0004603 | A1* | 1/2008 | Larkin | A61B 34/25 606/1 |
| 2009/0326318 | A1* | 12/2009 | Tognaccini | A61B 34/37 600/109 |
| 2015/0336269 | A1* | 11/2015 | Linnell | B25J 9/1656 700/245 |
| 2016/0016315 | A1* | 1/2016 | Kuffner, Jr. | B25J 19/06 901/49 |
| 2016/0303737 | A1* | 10/2016 | Rossano | B25J 9/1656 |
| 2017/0236262 | A1* | 8/2017 | Ohnuki | G06F 18/40 700/30 |
| 2017/0297205 | A1* | 10/2017 | Takase | B25J 19/02 |
| 2017/0364076 | A1* | 12/2017 | Keshmiri | G05B 19/41 |
| 2018/0236657 | A1* | 8/2018 | Kuwahara | B25J 9/1671 |
| 2018/0250818 | A1* | 9/2018 | Maeda | B25J 9/1682 |
| 2019/0105776 | A1* | 4/2019 | Ho | A61B 34/70 |
| 2019/0125461 | A1* | 5/2019 | Zheng | G06N 3/08 |
| 2019/0183591 | A1* | 6/2019 | Johnson | B25J 9/1666 |

OTHER PUBLICATIONS

Huber et al., "Efficient Closed-Form Task Space manipulability for a 7-DOF Serial Robot," Nov. 26, 2019 (Year: 2019).*
Beeson et al., "Cartesian Motion Planning & Task Programming with Craftsman", Conference Paper (2016).
Kohlbrecher et al., "A Comprehensive Software Framework for Complex Locomotion and Manipulation Tasks Applicable to Different Tupes of Humanoid Robots", Frontiers in Robotics and AI, vol. 3, Article 31 (2016).
Kunze, "On-the-Fly Workspace Visualization for Redundant Manipulators" (2016).
Written Opinion and International Search Report for corresponding PCT application No. PCT/US2019/062188 dated Jul. 28, 2020.

* cited by examiner

METHODS AND SYSTEMS FOR GRAPHICAL USER INTERFACES TO CONTROL REMOTELY LOCATED ROBOTS

CROSS REFERENCE TO RELATED APPLICATION

The present application is the US National Phase under 35 U.S.C. § 371 of International Application PCT/US2019/062188, filed Nov. 19, 2019, which is hereby incorporated by reference in its entirety.

FIELD

The present disclosure relates generally to operation of a robot or a robotic device, and more specifically to, a graphical user interface (GUI) providing representations of limits of a range of motion of the robot for preview to determine valid poses of the robot.

BACKGROUND

In industrial or commercial settings, remotely operating a robot is becoming more common. In such situations, an operator may not be within a vicinity of the robot and may not be able to see the robot. The operator relies on sensors (e.g., cameras) that are located on or surrounding the robot to operate and control the robot.

The operator requires some type of feedback after providing instructions for operation of the robot to learn if a task was successful. Thus, a feedback system for remote operation of robots is needed.

SUMMARY

Implementations disclosed herein relate to methods for controlling operation of a robot or a robotic device, for example. The methods are computer-implemented methods performed at least in part by computers or computing devices, for example.

Some implementations disclosed herein are additionally or alternatively directed to particular technique(s) for causing the robot to perform a task, in accordance with a programmed trajectory of movement of the robot.

Some implementations disclosed herein are additionally or alternatively directed to providing, for display on the GUI of the computing device, a representation of the robot as a preview and modifying characteristics of the transparent representation of the robot and of the boundary illustration on the GUI to inform of an invalid pose.

Some implementations disclosed herein are additionally or alternatively directed to providing, for display on the GUI of the computing device, a representation of the robot as a preview and based on a pose provided by the representation being a valid pose, sending instructions to the robot causing the robot to perform the pose.

Some implementations disclosed herein are additionally or alternatively directed to providing, for display on the GUI of the computing device, a trajectory cloud representation of the robot executing the test movement, and modifying characteristics of the trajectory cloud representation of the robot in the GUI to inform of collisions of the robot with itself or with an object.

Some implementations disclosed herein are additionally or alternatively directed to providing, for display on the GUI of the computing device, a trajectory cloud representation of the robot executing the test movement, and generating, for display on the GUI, a timeline of the test movement of the robot including indications along the timeline representing instances of the collisions of the robot with itself or with the object during the test movement.

Although some examples are described herein with reference to manipulations that include grasping and/or placing objects, it is understood that techniques described herein can be utilized for a variety of robotic manipulations on objects or for a variety of movements of the robot. For example, techniques can be utilized for a manipulation that includes pushing and/or pulling an object to move it to a different location and/or to mate it with another object. Also, for example, techniques can be utilized for a manipulation that includes grasping a first object, grasping a second object, coupling the first and second object together, and placing the coupled object in a particular location. As yet another example, techniques can be utilized for a manipulation that includes operating on an object with an end effector that includes an etching tool, a screwdriver tool, a cutting tool, and/or other tool(s).

The above description is provided as an overview of some implementations of the present disclosure. Further description of those implementations, and other implementations, are described in more detail below.

Other implementations may include a transitory or non-transitory computer readable medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers or computing devices and/or one or more robots or robotic devices that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein. Thus, the features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
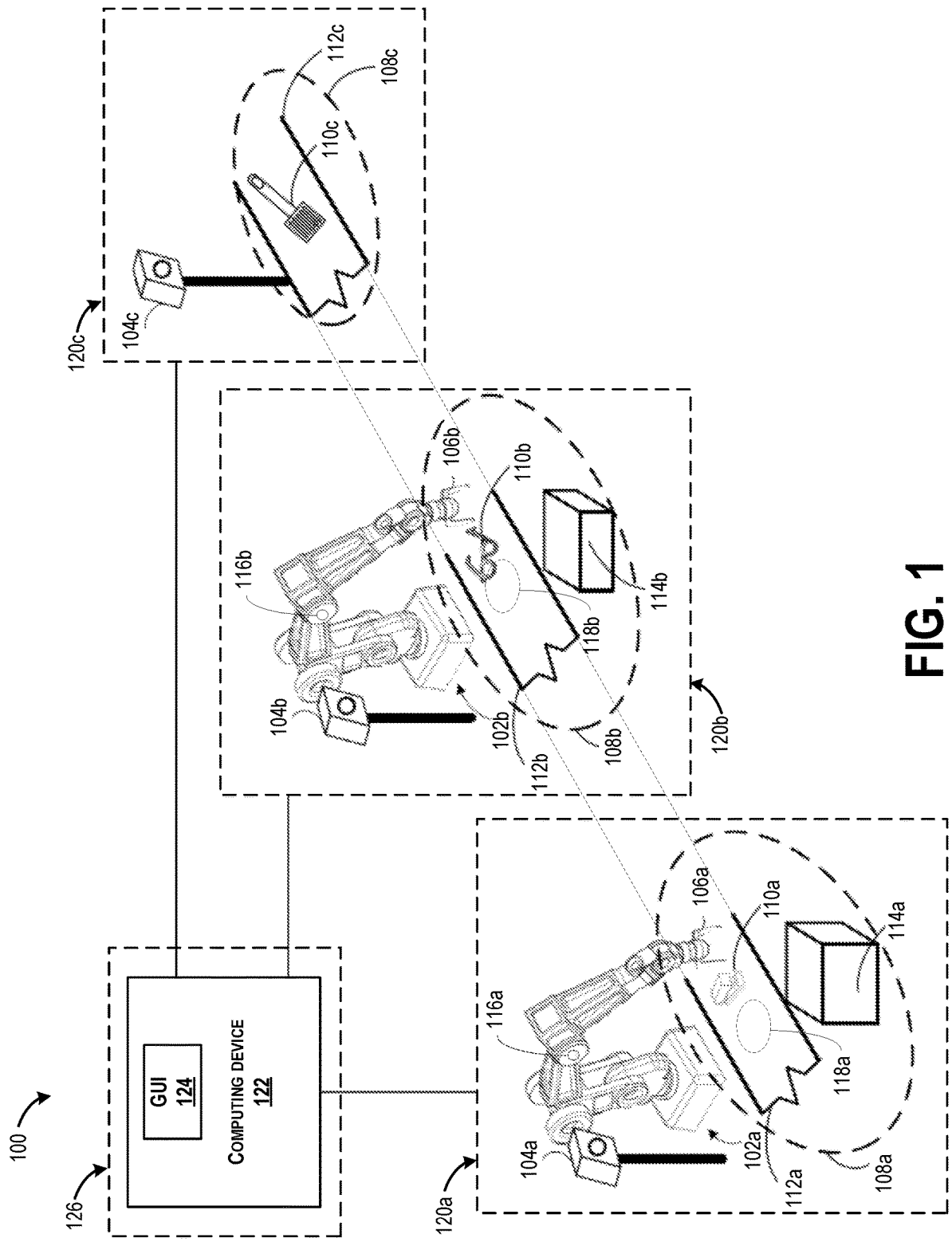
FIG. 1 illustrates an example of an environment in which implementations described herein can be implemented.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods provide a graphical user interface (GUI) for an operator of a robot that includes visualizations showing operators of valid and invalid poses and trajectories for movement of the robot during real-time interactive control of the robot. The illustrations assist with teaching operators kinematics of the robot, and also prevent damage to the robot and its surroundings by informing of invalid poses prior to the robot being controlled to perform the invalid pose. The visualizations can include a single robot, robot and the environment, and planning for multiple robots.

The visualizations indicate to the operator various functional capabilities or constraints of the robot. The GUI thus prompts the operator to interact with the robot in a continued or guided way to enable the proper functioning of the robot. For example, an operator performing real-time interactive control of the robot can modify their control of the robot based on the technical feedback presented to the operator. The robot can therefore be instructed to perform a technical task without exceeding various physical limitations of the robot or compromising safety in the environment of the robot. For example, implementations of the present disclosure could be implemented in the course of surgery using a surgical robot. The GUI may act as a visual aid for the surgeon by displaying visualizations showing valid and invalid poses and trajectories for movement of the surgical robot. This may assist the surgeon to perform a surgical action (such as positioning an implant) in a safer and more precise manner. Implementations of the present disclosure could be implemented in a variety of other scenarios such as product assembly and search and rescue.

The GUI provides a tool enabling remote control of the robot that informs the operators when the robot is at a maximum boundary of movement. For example, different icons and graphical representations can be illustrated to show movement that is outside of a range of movement of the robot. The visualizations can render portions of the robot in different colors or provide transparent views when maximum movement or a collision is likely to occur. Thus, the GUI provides a presentation of an internal state of the robot, and also, enables interaction between the user and the GUI (e.g., the user initiating or responding to the representation of the robot).

In addition, with respect to collisions, the robot or an environment of the robot includes cameras to provide images of the geometry of all surrounding objects and the environment to enable detection of when the robot will hit an object. The graphical representations can then be provided to illustrate a collision. Sensors on the robot or in the environment capture a full three-dimensional (3D) scene around the robot to enable detections to be made in real time for further illustrations to be provided of movement that will result in safe/unsafe outcomes.

Further illustrations can be provided to inform of a range of movements classified into safe, unsafe, or potentially safe and potentially unsafe. For example, some collision may be acceptable, depending on the object colliding with or a force of the collision, and thus the graphical representations can be more detailed to give detailed feedback.

Simulations of movement of the robot can be performed to define boundaries, and can also learn over time by observing where collisions occur. Observations can be recorded for when the robot felt like it ran into something, and with a log of these events and data from the cameras, predictions can be made as to classifications to associate with the robot movement.

Additional feedback can be provided to the operator in the form of haptic feedback, such as a torque, force, or vibration feedback applied to a controller used by the operator to assist the operator with a better understanding of the environment before actually performing an action by the robot. This can be fused with material detection using radar to even more accurately reflect haptic forces. When combining haptic motors with other sensors, such as a microphone, it is possible to capture characteristic vibrations when scratching across a rough surface with the robot. This data can then be transferred to the operator where the haptics are reproduced with a controller or similar haptic device.

Thus, examples herein provide feedback to a remote operator to assist with control of the robot by means of a continued and/or guided human-machine interaction process. A remote operator can be provided with technical information regarding the current and/or future poses of a robot, wherein this technical information would not otherwise have been readily available to an operator that is not in the vicinity of the robot. The information presented to the operator by the GUI relates to an internal state prevailing in the robot that enables the operator to properly operate the robot, for example avoiding technical malfunctions brought about by exceeding limitations of the robot. The remote operator can be guided to control the robot in a manner that is safer and more efficient, reducing the number of instructions sent to the robot that would not have ultimately led to the desired output due to the physical constraints of the robot and the like. Efficiency in operation of the robot in terms of power consumption and/or time to complete a task may result from the improved human-machine interaction.

In addition, feedback can be provided locally at the robot to provide information to personnel in a vicinity of the robot. For example, when a person approaches a robot or collaborative robot, it can be difficult to understand a state of the robot, where the robot is going to move and what trajectories the robot is going to take. When using an augmented reality (AR) device, camera images can be overlaid with robot data to provide more understandable information and put this into context. For example, the trajectories can be shown and the current planned action can be visualized in 3D as an overlay on the robot in a captured image. Further graphical representations can be provided as an overlay to allow the person to visualize areas where the robot may be entering a protective stop (e.g., "red glow") or visualize movement that robot is likely to take.

Referring now to the figures, FIG. 1 illustrates an example of an environment 100 in which implementations described herein can be implemented. FIG. 1 includes a first robot 102a and a vision component 104a, a second robot 102b and a vision component 104b, and an additional vision component 104c.

The robots 102a and 102b, the vision components 104a and 104b, and the additional vision component 104c are all deployed in the environment 100, such as a manufacturing facility, a packaging facility, or other environment. Although the environment 100 can also include additional robots and/or additional vision components, but only robots 102a and 102b, and the additional vision component 104c, are illustrated in FIG. 1 for simplicity.

The robots 102a and 102b are each a "robot arm" having multiple degrees of freedom to enable traversal of a corresponding grasping end-effector 106a and 106b along any of a plurality of potential paths or trajectories of movement to position the grasping end effector in desired locations. The robots 102a and 102b each further controls two opposed "claws" of their corresponding grasping end-effector 106a and 106b to actuate the claws between at least an open position and a closed position (and/or optionally a plurality of "partially closed" positions). Although these types of robots are illustrated in FIG. 1, additional and/or alternative robots may be utilized, including additional robot arms that are similar to the robots 102a and 102b, robots having other robot arm forms, robots having a humanoid form, robots having an animal form, robots that move via one or more wheels, an unmanned aerial vehicle ("UAV"), and so forth. Also, although particular grasping end effectors are illustrated in FIG. 1, additional and/or alternative end effectors may be utilized (or even no end effectors), such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors (e.g., welding tools, cutting tools, etc.).

The vision components 104a and 104b can be, for example, various vision sensors, such as a monographic camera (e.g., generating 2D RGB images), a stereographic camera (e.g., generating 2.5D RGB images), a laser scanner (e.g., generating 2.5D "point clouds"), and vision data therefrom can be provided to and utilized by corresponding robots 102a and 102b as described herein. Although illustrated adjacent to the robots 102a and 102b in FIG. 1, in other implementations, the vision components 104a and 104b can alternatively be coupled or attached to the robots 102a and 102b (e.g., attached on a portion of an arm or near an end effector).

The additional vision component 104c can be, for example, a monographic camera, a stereographic camera, a laser scanner, and/or other vision component, and can be operatively connected to one or more systems or computing devices (e.g., system 300 or computing device 122) disclosed herein. Optionally, multiple additional vision components can be provided and vision data from each utilized as described herein.

The robot 102a can access a workspace 108a in the environment 100 that, in FIG. 1, includes an object 110a (e.g., stapler) on a conveyor portion 112a of a conveyor system, and also includes a container 114a. The robot 102a can utilize object manipulation parameters, determined as described herein, in grasping the object 110a and placing the object 110a appropriately in the container 114a. More generally, the robot 102a can be operated in the environment 100 to perform a task of transporting the object 110a from a first area (e.g., on the conveyor portion 112a) to a second area (e.g., in the container 114a), for example. Other objects can be on the conveyor portion 112a in the workspace 108a at different times, as can different containers (e.g., the containers can be placed by a separate system or be on a separate conveyor system). For example, as the conveyor system moves, other objects will be transported into the workspace 108a and can be manipulated by the robot 102a while in the workspace 108a. The robot 102a can likewise utilize corresponding object manipulation parameters for picking and placing such objects, and/or performing other manipulations on such objects.

The robot 102b can access a robot workspace 108b in the environment 100 that, in FIG. 1, includes an object 110b (e.g., sunglasses) on a conveyor portion 112b of the conveyor system, and also includes a container 114b. The robot 102b can utilize object manipulation parameters, determined as described herein, in grasping the object 110b and placing it appropriately in the container 114b. More generally, the robot 102b can be operated in the environment 100 to perform a task of transporting the object 110b from a first area (e.g., on the conveyor portion 112b) to a second area (e.g., in the container 114b), for example. Other objects can be on the conveyor portion 112b in the workspace 108b at different times, as can different containers. The robot 102b can likewise utilize corresponding object manipulation parameters for picking and placing such objects, and/or performing other manipulations on such objects.

The additional vision component 104c has a field of view of an area 108c of the environment 100 that is disparate from the workspace 108a and disparate from the workspace 108b. In FIG. 1, the area 108c includes a conveyor portion 112c of the conveyor system, and also includes an object 110c (e.g., a spatula). The area 108c can be "upstream" of the workspace 108a and/or the workspace 108b, in that objects to be manipulated first pass through the area 108c prior to being transported to the workspace 108a or the workspace 108b. For example, the conveyor system can first pass objects through the area 108c before those objects are routed, by the conveyor system, to either the workspace 108a or the workspace 108b. For instance, in FIG. 1, the spatula is in the area 108c, but has not yet been transported to the workspace 108a or the workspace 108b.

As described in detail herein, in various implementations, the vision components 104a and 104b and the additional vision component 104c can each capture vision data that captures features of the environment 100 including object features of the objects 110*a-c*. Further, the vision data can be utilized, by a system or a computing device (described below), in determining object manipulation parameter(s) for enabling the robot 102*a* or the robot 102*b* to manipulate (e.g., pick and place) the objects 110*a-c*. In these and other manners, the robots 102*a* and 102*b* can operate more efficiently, as the object manipulation parameter(s) for manipulating objects can be quickly determined, optionally before the objects even reach the robot workspaces 108*a* and 108*b*, and movement of the robots 102*a-b* can be optimized rather than being rigidly caused to follow a pre-stored programmed trajectory, for example.

The vision data can be utilized to determine the object manipulation parameter(s) prior to the robots 102*a-b* manipulating the objects 110*a-b* so that optimizations can be generated in advance of movement being initiated.

The environment 100 may also include one or more additional sensors in the environment 100 to provide additional sensor data. The additional sensors may include torque sensors 116*a-b* of the robots 102*a-b* or weight sensors 118*a-b* in the environment 100 positioned underneath the conveyor portions 112*a-b*. The additional sensor data can be utilized to further determine the second adjustment to the programmed trajectory of movement of the robots 102*a-b*, for example, based on knowledge of the weight of the objects 110*a-b* as well as strain on the robots 102*a-b*.

In FIG. 1, the robot 102*a* operates in a robot station 120*a*, the robot 102*b* operates in a robot station 120*b*, and the vision component 104*c* operates in robot station 120*c*. A computing device 122 including a graphical user interface (GUI) 124 is at an operator station 126 and is configured to teleoperate the robot 120*a*, the robot 120*b*, and the vision component 104*c*. The computing device 122 is thus in communication (either wired or wireless) with the robot 120*a*, the robot 120*b*, and the vision component 104*c* to send data or instructions signal to and to receive data or information from the robot 120*a*, the robot 120*b*, and the vision component 104*c*.

As described herein, the term "teleoperate" is used to indicate control of the robot from a location separate or distinct from the robot so as to remotely control the robot. Thus, the operator station 126 is separate and distinct from the robot stations 120*a-c*. In some examples, the operator station 126 is considered remote from the robot stations 120*a-c*, and may be in a separate room or a separate building (or even a separate geographic area) from the robot stations 120*a-c*.

Figure 2:
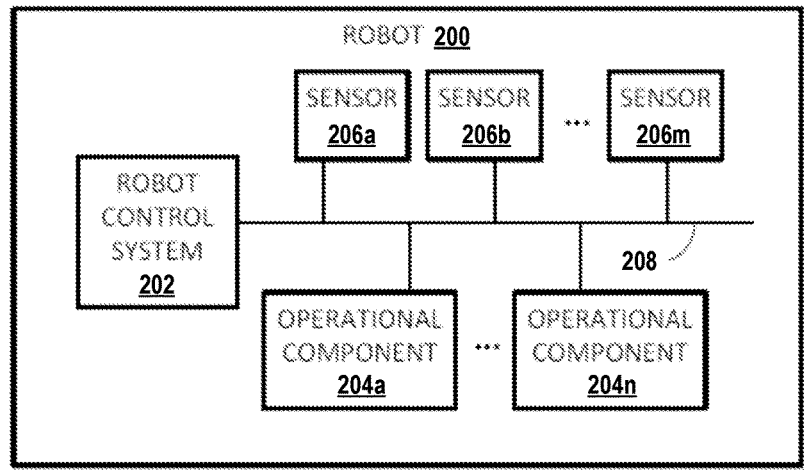
FIG. 2 schematically depicts an example architecture of a robot, according to an example implementation.

FIG. 2 schematically depicts an example architecture of a robot 200, according to an example implementation. The robot 200 may be in a form as shown in FIG. 1 for the robots 102*a-b*, and the illustration in FIG. 2 is an example block diagram representation of the robots 102*a-b*, for example. The robot 200 includes a robot control system 202, one or more operational components 204*a-n*, and one or more sensors 206*a-m*. The sensors 206*a-m* may include, for example, vision components, light sensors, pressure sensors, pressure wave sensors (e.g., microphones), proximity sensors, accelerometers, gyroscopes, thermometers, barometers, and so forth. While the sensors 206*a-m* are depicted as being integral with the robot 200, this is not meant to be limiting. In some implementations, the sensors 206*a-m* may be located external to the robot 200, e.g., as standalone units.

The operational components 204*a-n* may include, for example, one or more end effectors and/or one or more servo motors or other actuators to effectuate movement of one or more components of the robot 200. For example, the robot 200 may have multiple degrees of freedom and each of the actuators may control actuation of the robot 200 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 202 may be implemented in one or more processors, such as a CPU, GPU, and/or other controller(s) of the robot 200. In some implementations, the robot 200 may comprise a "brain box" that may include all or aspects of the control system 202. For example, the brain box may provide real time bursts of data to the operational components 204*a-n*, with each of the real time bursts comprising a set of one or more control commands that dictate, inter alia, the parameters of motion (if any) for each of one or more of the operational components 204*a-n*. In some implementations, the robot control system 202 may perform one or more aspects of one or more methods described herein.

As described herein, in some implementations all or aspects of the control commands generated by robot control system 202 can be generated based on object manipulation parameter(s) generated according to techniques described herein. Although the robot control system 202 is illustrated in FIG. 2 as an integral part of the robot 200, in some implementations, all or aspects of the robot control system 202 may be implemented in a component that is separate from, but in communication with, the robot 200. For example, all or aspects of the robot control system 202 may be implemented on one or more computing devices that are in wired and/or wireless communication with the robot 200.

In FIG. 2, the robot control system 202, the sensors 202*a-m*, and the operational components 204*a-n* are each coupled to a communication bus 208 to enable transfer of data, for example.

Figure 3:
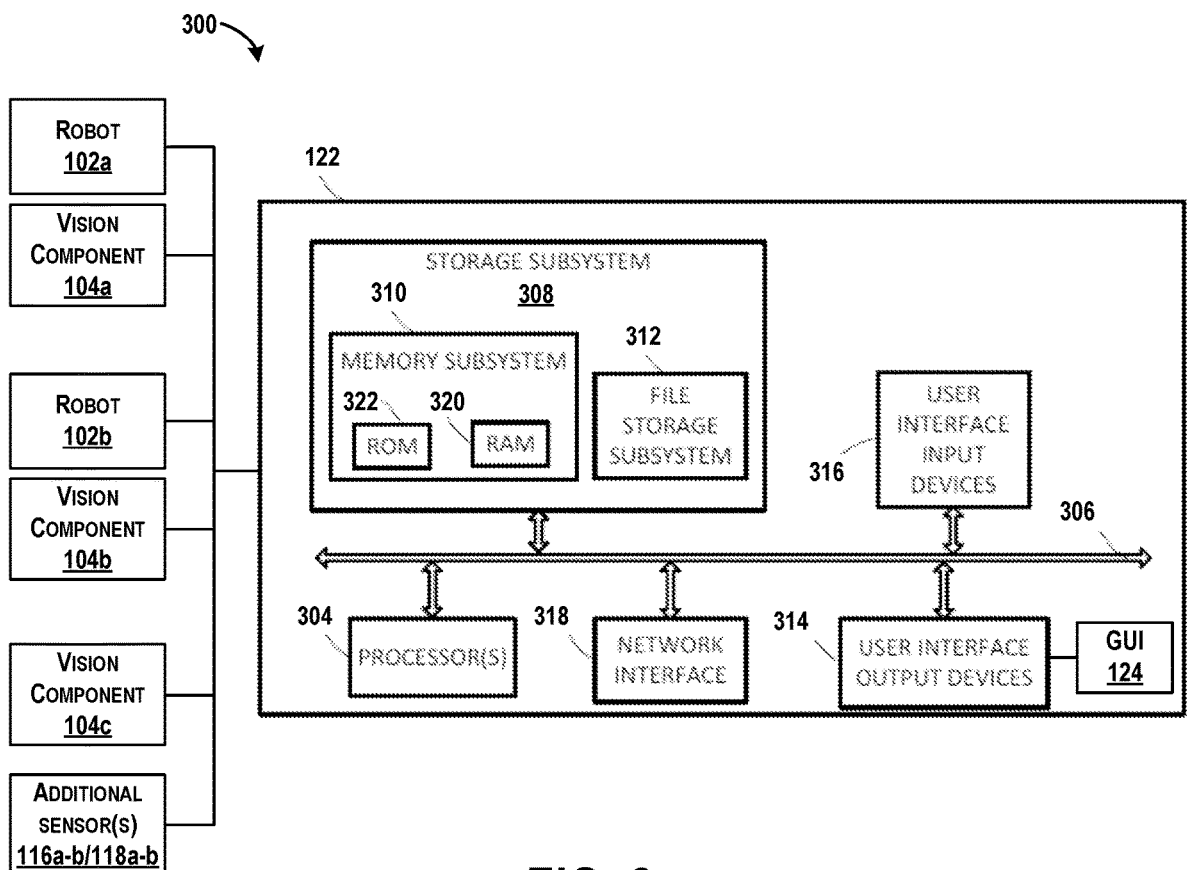
FIG. 3 is a block diagram of an example of a system that may optionally be utilized to perform one or more aspects of techniques described herein, according to an example implementation.

FIG. 3 is a block diagram of an example of a system 300 that may optionally be utilized to perform one or more aspects of techniques described herein, according to an example implementation. The system 300 includes the computing device 122, which may further be utilized to perform one or more aspects of techniques described herein.

The computing device 122 is in communication (e.g., either through wired or wireless communication links) with the robots 102*a-b*, the vision components 104*a-b*, the additional vision component 104*c*, and the additional sensors (e.g., the torque sensors 116*a-b* and the weight sensors 118*a-b*) to receive information from or communicate information to these elements.

The computing device 122 includes at least one processor 304 that communicates with a number of peripheral devices via a bus subsystem 306. These peripheral devices may include a storage subsystem 308, including, for example, a memory subsystem 310 and a file storage subsystem 312, user interface output devices 314, user interface input devices 316, and a network interface subsystem 318. The input and output devices allow user interaction with the computing device 122. The network interface subsystem 318 provides an interface to outside networks and is coupled to corresponding interface devices in other computing devices.

The user interface input devices 316 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing device 122 or onto a communication network.

The user interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computing device 122 to the user or to another machine or computing device.

Further, as shown in FIG. 3, the user interface output device 314 can include or provide the GUI 124, for example.

The user interface input devices 316 and the user interface output devices 314 may more generally also include communication interfaces, such as a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, such communication interfaces may be configured to receive input data from one or more devices, and may also be configured to send output data to other devices.

The processor 304 may be general-purpose processors or special purpose processors (e.g., digital signal processors, application specific integrated circuits, etc.). The processor 304 may receive inputs from the user interface input devices 316, and process the inputs to generate outputs that are stored in the storage subsystem 308. The processor 304 can be configured to execute instructions (e.g., computer-readable program instructions) that are stored in the storage subsystem 308 and are executable to provide the functionality of the computing device 122 described herein.

The storage subsystem 308 stores programming and data constructs that provide the functionality of some or all of the modules described herein. For example, the storage subsystem 308 may include the logic to perform selected aspects of one or more methods described herein. The storage subsystem 308 can include a non-transitory computer readable medium having stored thereon instructions, that when executed by the processors 304 of the computing device 122, cause the computing device 122 to perform functions of the methods described herein.

These software modules are generally executed by the processor 304 alone or in combination with other processors. The memory 310 used in the storage subsystem 308 can include a number of memories including a main random access memory (RAM) 320 for storage of instructions and data during program execution and a read only memory (ROM) 322 in which fixed instructions are stored. The file storage subsystem 312 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 312 in the storage subsystem 308, or in other machines accessible by the processor(s) 304. The storage subsystem 308 may thus include or be considered a non-transitory computer readable medium, for example.

The bus subsystem 306 provides a mechanism for letting the various components and subsystems of the computing device 122 communicate with each other as intended. Although the bus subsystem 306 is shown schematically as a single bus, alternative implementations of the bus subsystem may use multiple busses.

The computing device 122 can be of varying types including a workstation, server, computing cluster, blade server, server farm, or any other data processing system or computing device. Due to the ever-changing nature of computers and networks, the description of the computing device 122 depicted in FIG. 3 is intended only as a specific example for purposes of illustrating some implementations. Many other configurations of the computing device 122 are possible having more or fewer components than the computing device 122 depicted in FIG. 3.

Within examples, the computing device 122 may also be a component of the robot 102a or robot 102b, rather than being separate components.

The computing device 122 provides information to a user to assist with operation of the robots 102a-b by displaying on the GUI 124 information as to valid and invalid poses or movement of the robots 102a-b. During teleoperation of the robots 102a-b, the user can thus better visualize how the robots 102a-b would operate based on inputs provided, and then when target poses are found to be valid poses, the computing device can send instructions to the robot causing the robot to perform the target pose.

Figure 4:
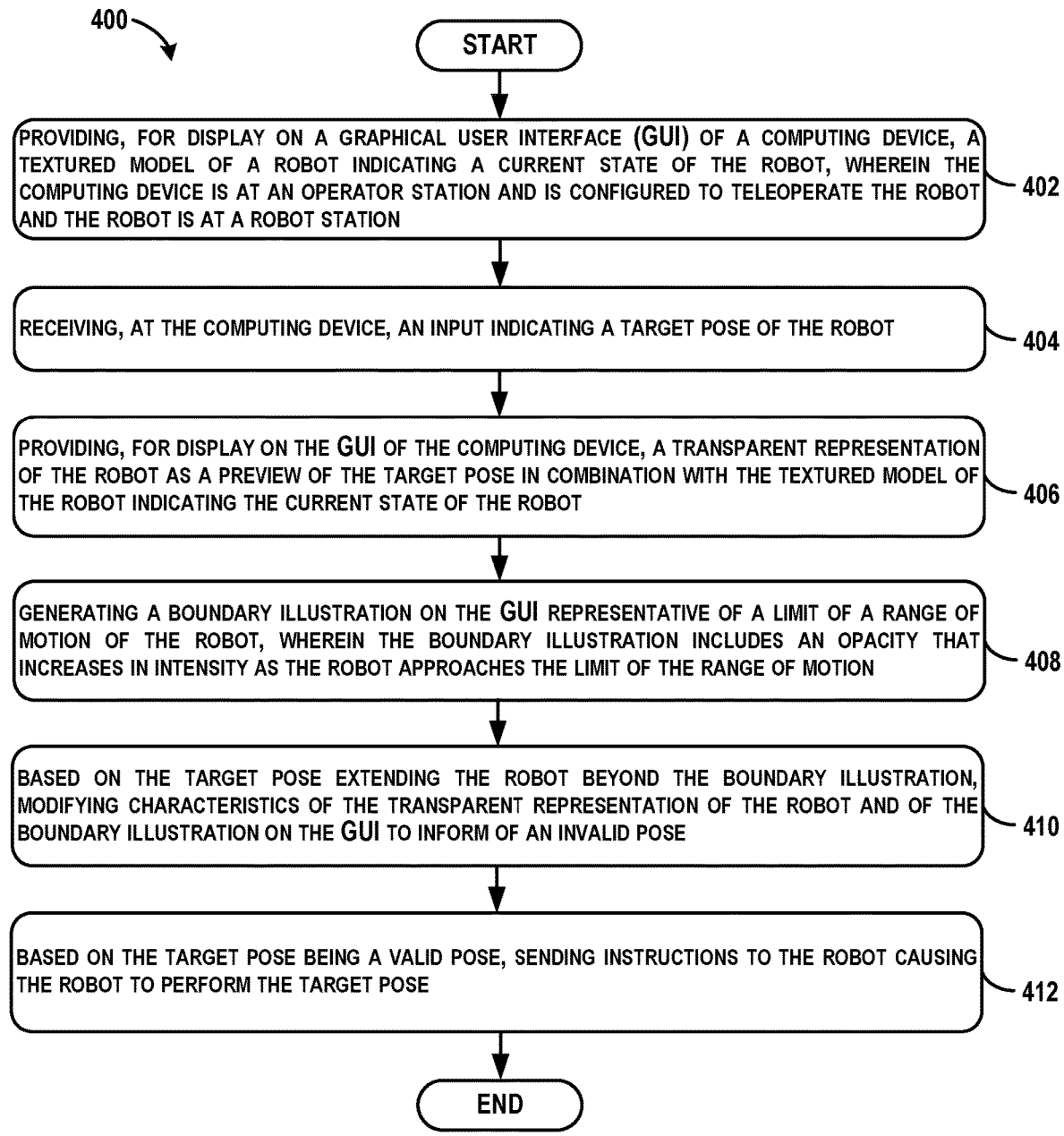
FIG. 4 shows a flowchart of an example of a computer-implemented method, according to an example implementation.

FIG. 4 shows a flowchart of an example of a computer-implemented method 400, according to an example implementation. Method 400 shown in FIG. 4 presents an example of a method that could be used with the robots 102a-b, robot 200, system 300, or computing device 122 shown in FIGS. 1-3, for example. Further, devices or systems may be used or configured to perform logical functions presented in FIG. 4. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 4, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes providing, for display on a graphical user interface (GUI) 124 of a computing device 122, a textured model of a robot indicating a current state of the robot, and the computing device is at an operator station and is configured to teleoperate the robot and the robot is at a robot station.

At block 404, the method 400 includes receiving, at the computing device 122, an input indicating a target pose of the robot. For example, the user may provide an input, via touchscreen, keyboard, etc., indicating a target pose or configuration of the robot.

At block 406, the method 400 includes providing, for display on the GUI 124 of the computing device 122, a transparent representation of the robot as a preview of the target pose in combination with the textured model of the robot indicating the current state of the robot.

Figure 5:
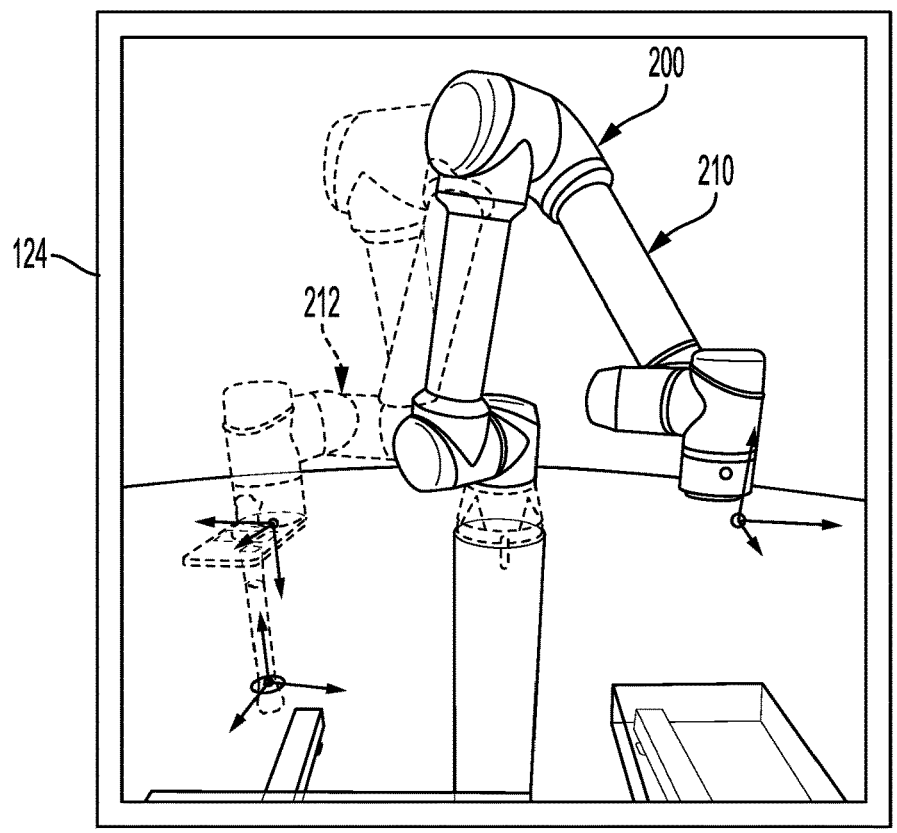
FIG. 5 illustrates an example of the GUI with a textured model of the robot, according to an example implementation.

FIG. 5 illustrates an example of the GUI 124 with a textured model 210 of the robot 200, according to an example implementation. In FIG. 5, the GUI 124 illustrates the textured model 210 of the robot 200 indicating a current state of the robot 200. FIG. 5 also illustrates a transparent representation 212 of the robot 200 as a preview of the target pose in combination with the textured model 210 of the robot 200 indicating the current state of the robot 200. The computing device 122 receives the input and simulates movement so as to generate the transparent representation 212 of the robot 200 as a preview of the target pose.

Within examples, robotic simulators can be utilized to simulate all or parts of the robot and/or all or parts of the workspace, and can render a simulation of the robot movement. The robotic simulator can be used to simulate an environment that includes corresponding object(s), to simulate all or parts of a robot (e.g., at least end effector(s) of the robot) operating in the simulated environment, and to optionally simulate interactions between the simulated robot and the simulated environmental objects in response to simulated robotic actions. Various simulators can be utilized, such as physics engines that simulate collision detection, soft and rigid body dynamics, etc. One non-limiting example of such a simulator is the BULLET physics engine.

Thus, operators start from a scene as shown in FIG. 5, in which the operator is presented with a realistic textured model of the robot, indicating the current state of the real robot. The blue, transparent (or ghost) arm is a preview of a target pose, which the operator manipulates to define the pose they would like the robot to move to. With the operator remotely controlling the robot 200, the preview of the target pose enables the operator to determine whether the target pose is valid or not.

Referring back to FIG. 4, at block 408, the method 400 includes generating a boundary illustration on the GUI representative of a limit of a range of motion of the robot, and the boundary illustration includes an opacity that increases in intensity as the robot approaches the limit of the range of motion.

Figure 6:
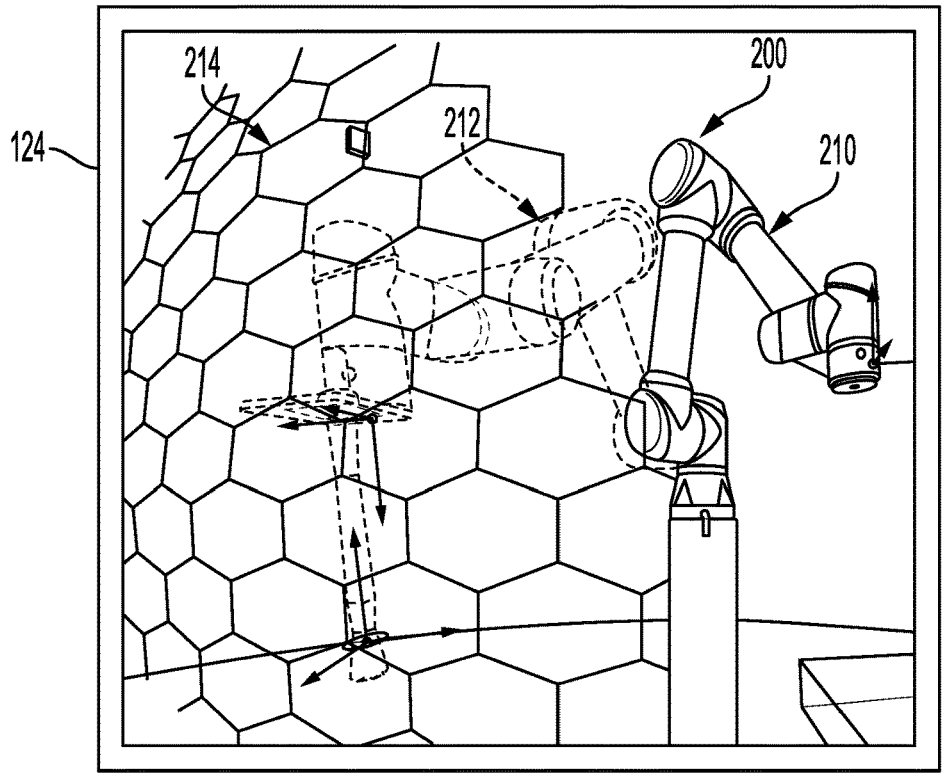
FIG. 6 illustrates an example of the GUI with a boundary illustration, according to an example implementation.

FIG. 6 illustrates an example of the GUI 124 with a boundary illustration 214, according to an example implementation. Within examples, safety prevents operators from extending the transparent arm too far from a base by showing the boundary illustration 214 as a "shield". The boundary illustration 214 may be a hypothetical or theoretical boundary for a limit of the range of motion of the robot, so that the transparent representation 212 will not cross the boundary illustration 214.

In FIG. 5, the boundary illustration 214 is shown as a honeycomb wall or polygon wall, for example. In some examples, the boundary illustration 214 is generated based on a conceptual spherical boundary representing the limit of the range of motion of the robot 200, and an intensity of the opacity of the boundary illustration 214 is highest from a point on the conceptual spherical boundary closest to the robot 200, and the intensity decreases radiating away from the point on the conceptual spherical boundary. Thus, the sphere shield opacity grows in intensity as the robot 200 approaches the spherical boundary, and the intensity is highest from the point on the spherical boundary closest to an interaction point of the robot 200 radiating outward.

Referring back to FIG. 4, at block 410, the method 400 includes based on the target pose extending the robot 200 beyond the boundary illustration 214, modifying characteristics of the transparent representation 212 of the robot 200 and of the boundary illustration 214 on the GUI 124 to inform of an invalid pose.

Figure 7:
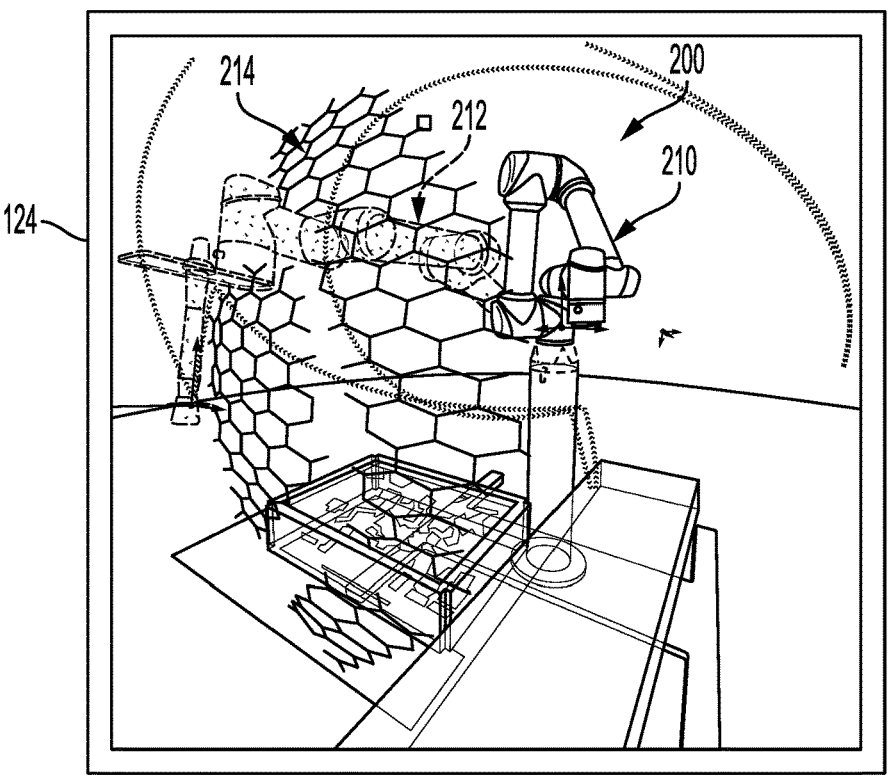
FIG. 7 illustrates an example of the GUI with the boundary illustration having modified characteristics, according to an example implementation.

FIG. 7 illustrates an example of the GUI 124 with the boundary illustration 214 having modified characteristics, according to an example implementation. Within examples, extending the robot 200 past the boundary illustration 214 causes both the sphere and the transparent representation 212 of the robot 200 to change colors, such as turn red. Thus, modifying characteristics can include the computing device 122 changing a color of the transparent representation 212 of the robot 200 and of the boundary illustration 214 on the GUI 124. Other characteristics may be changed as well, such as causing the boundary illustration 214 or the transparent representation 212 of the robot 200 to blink or further alarms can be triggered including haptic or audio feedback to the operator.

Referring back to FIG. 4, at block 412, the method 400 includes based on the target pose being a valid pose, sending instructions to the robot 200 causing the robot to perform the target pose. Using the GUI 124 and the method 400, the computing device 122 can verify target poses, provide visual representations of the poses based on input from operator, and then control the robot 200 when the target pose represents a valid pose. A valid pose may be one in which the transparent representation 212 of the robot 200 does not extend past or into the boundary illustration 214, and thus, is within the limit of range of motion of the robot 200.

Figure 8:
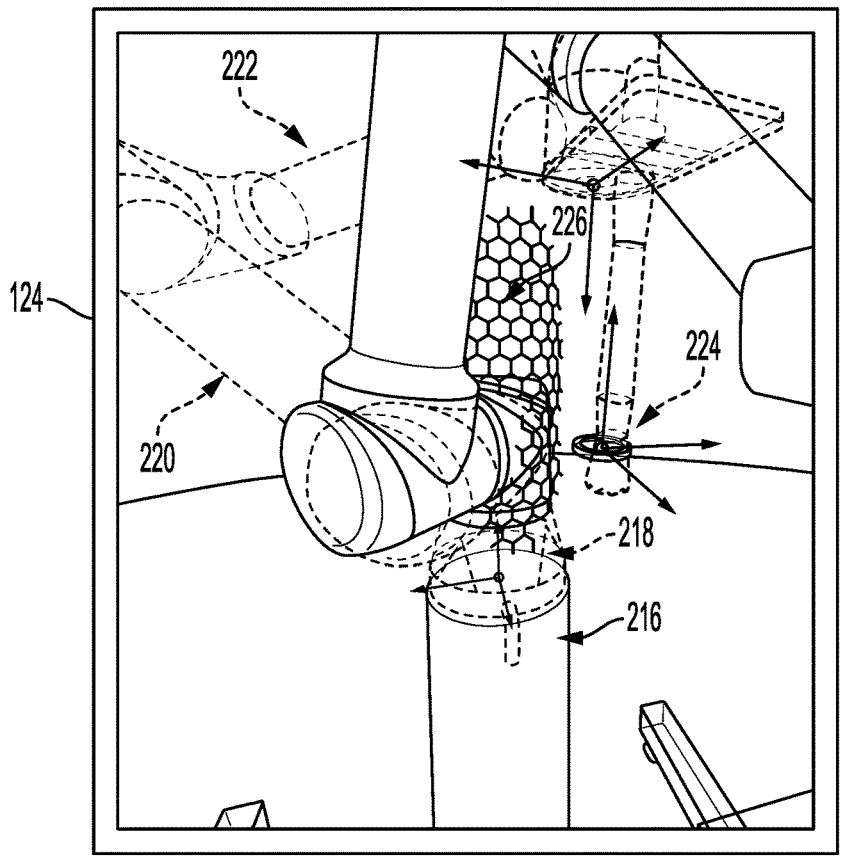
FIG. 8 illustrates an example of the GUI with an additional boundary illustration, according to an example implementation.

Within examples, the method 400 also includes generating additional boundary illustrations. FIG. 8 illustrates an example of the GUI 124 with an additional boundary illustration, according to an example implementation. Within examples, the robot 200 comprises a base 216, a center column 218 extending upward from the base 216, multiple arm components 220 and 222 connected in a serial connection through coupling links providing multiple degrees of freedom, and one of the multiple arm components is coupled to the center column 218, and an end effector 224 connected to a last one of the arm components in the serial connection. In this example, the boundary illustration 214 may be a first boundary illustration on the GUI 124 representative of the limit of the range of motion of the multiple arm components, and the method 400 can further include generating a second boundary illustration 226 on the GUI 124 extending upward from the center column 218 representative of a limit of a range of motion of the one of the multiple arm components coupled to the center column 218. The second boundary illustration 226 thus provides a representation of a limit of range of motion of a specific component of the robot 200. As the specific component reaches the boundary, or approaches the boundary, similar visual effects can occur to modify characteristics of the second boundary illustration 226 to provide feedback to the operator.

Within additional examples, the robot 200 is positioned in an environment 100, and the method 400 further includes receiving, from one or more vision components (e.g., the vision components 104a-c) in the environment, vision data that captures features of the environment, including object features of an object that is located in the environment, and generating a transparent representation of the object on the GUI illustrating a location of the object in the environment with respect to the robot.

Figure 9:
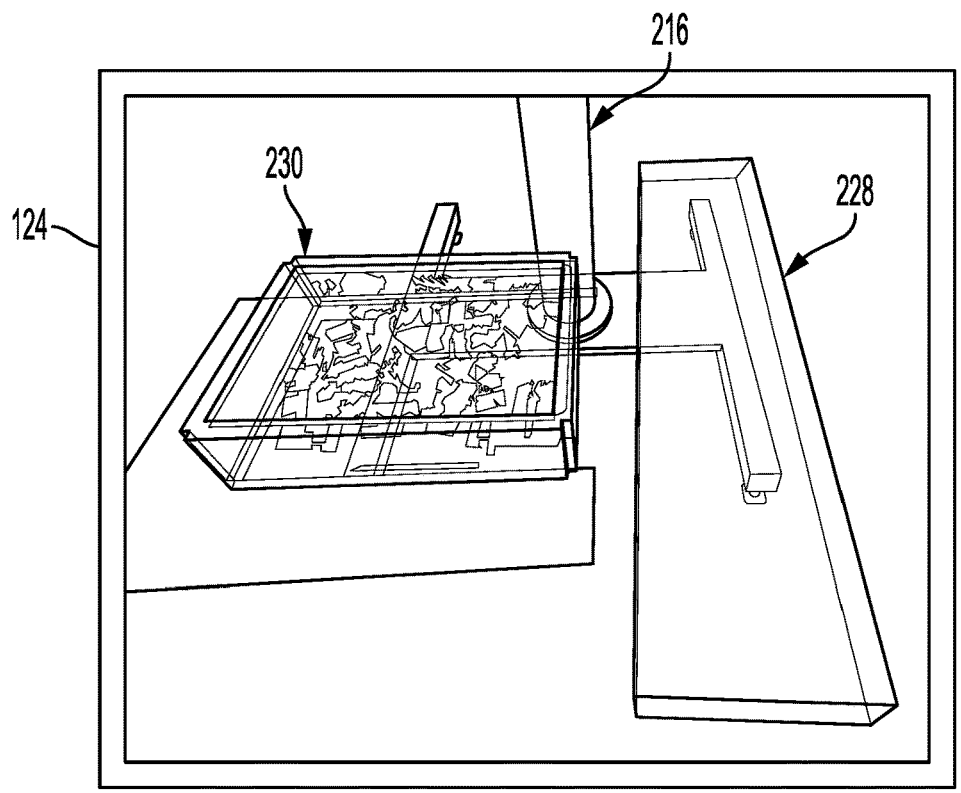
FIG. 9 illustrates an example of the GUI with additional object features being illustrated, according to an example implementation.

FIG. 9 illustrates an example of the GUI 124 with additional object features being illustrated, according to an example implementation. In FIG. 9, a transparent representation 228 of the object (e.g., a conveyor belt) is illustrated on the GUI showing a location of the object in the environment with respect to the robot 200. Another transparent representation 230 of a different object (e.g., a bin container) is also shown. Providing the transparent representations of the objects near the robot 200 enables the operator to visualize what may be in the pathway of motion. Also, by providing the objects as transparent representations, the operator is informed that the robot 200 can operationally move in areas occupied by the objects. In other examples, when the objects are shown as solid filled objects, the operator is informed that the robot 200 is unable to move in areas occupied by the objects. Thus, the computing device 122 determines that the robot can move in certain pathways, determines if any objects occupy the pathways, and then generates transparent representation of those objects for illustration on the GUI 124.

In FIG. 9, the objects in the environment may require collision detection, and thus, the computing device 122 further represents such objects by the transparent representations 228 and 230. The transparent representations 228 and 230 convey volumes of the objects, for example.

In further examples, the method 400 in FIG. 4 also includes simulating a possible movement of the robot 200 on the GUI 124 to achieve the target pose from the current state of the robot 200, based on detection of a collision with the object in the environment by the robot simulating the possible movement, generating on the GUI 124 a representation of a trajectory path of the robot simulating the possible movement resulting in the collision, and generating a representation on the GUI illustrating the collision.

Figure 10:
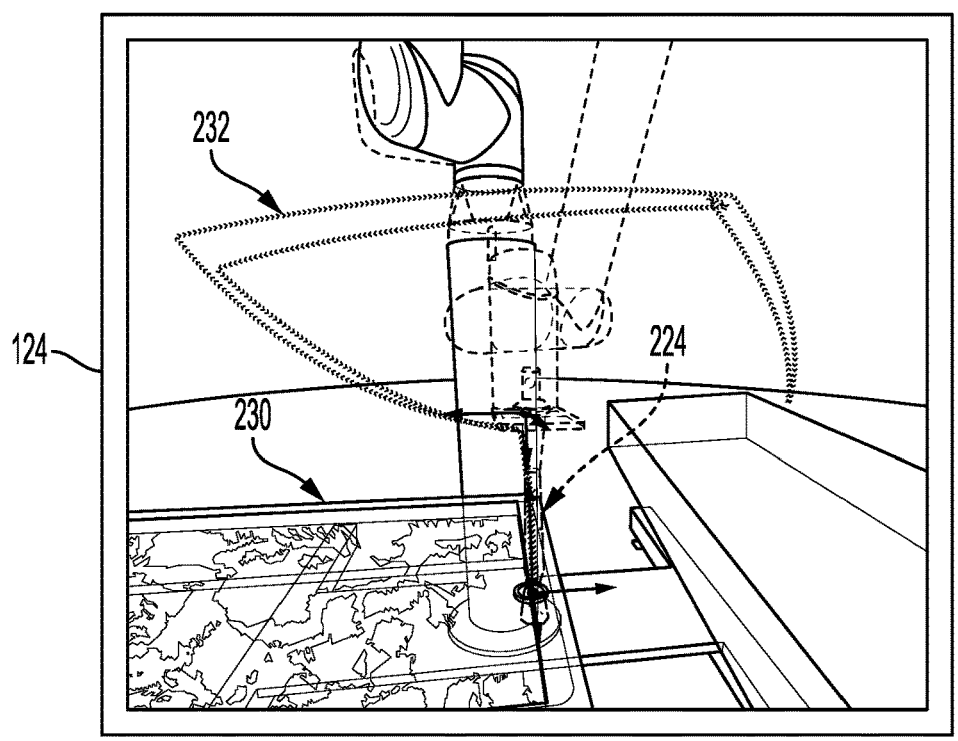
FIG. 10 illustrates an example of the GUI with collision detections illustrated, according to an example implementation.

FIG. 10 illustrates an example of the GUI 124 with collision detections illustrated, according to an example implementation. In FIG. 10, a simulated possible movement of the robot 200 is shown on the GUI 124 with dotted lines 232 showing movement of the end effector 224. In this example, the end effector 224 would collide with the object represented by the transparent representation 230. As such, a color of the end effector 224 can be modified to illustrate the simulated collision.

In some examples, based on the collision being acceptable, the method can include modifying characteristics of the representation on the GUI 124 illustrating the collision to inform of acceptable movement of the robot 200. Here, a collision may be acceptable or desired, in some operation, and so the characteristics of the end effector 224 may be adjusted to show a green color, for example. As such, collisions between known collision volumes are evaluated by locally simulating each runnable program (Action) in the GUI 124, shown by changing a color on the robot 200. When a collision is detected, the trajectory path that the tool interaction point would take during the Action is shown as a series of lines including arrows, indicating movement direction.

Thus, in some examples, the method 400 can also include simulating a possible movement of the robot 200 on the GUI 124 to achieve the target pose from the current state of the robot 200, and based on detection of a collision with the object in the environment by the robot simulating the possible movement, generating on the GUI 124 a representation of a trajectory path of the robot simulating the possible movement as a series of lines with arrows indicating movement direction resulting in the collision.

In addition, the method 400 can further include simulating a possible movement of the robot 200 on the GUI 124 to achieve the target pose from the current state of the robot, and based on detection of a collision of the robot 200 with a portion of the robot 200 simulating the possible movement, modifying characteristics of the transparent representation of the robot. For example, due to a configuration of the robot 200, in which multiple segments of an arm are included, the robot 200 could potentially collide with itself and the transparent representation can reflect this problem. In a specific example, the robot includes the base 216, a center column extending upward from the base, multiple arm components 220 and 222 connected in a serial connection through coupling links providing multiple degrees of freedom, and one of the multiple arm components is coupled to the center column, and the end effector 224 connected to a last one of the arm components in the serial connection. The method 400 can include simulating a possible movement of the robot 200 on the GUI 124 to achieve the target pose from the current state of the robot, and based on exceeding a maximum joint angle of one of the multiple arm components of the robot simulating the possible movement, modifying characteristics of the one of the multiple arm components on the transparent representation of the robot.

Figure 11:
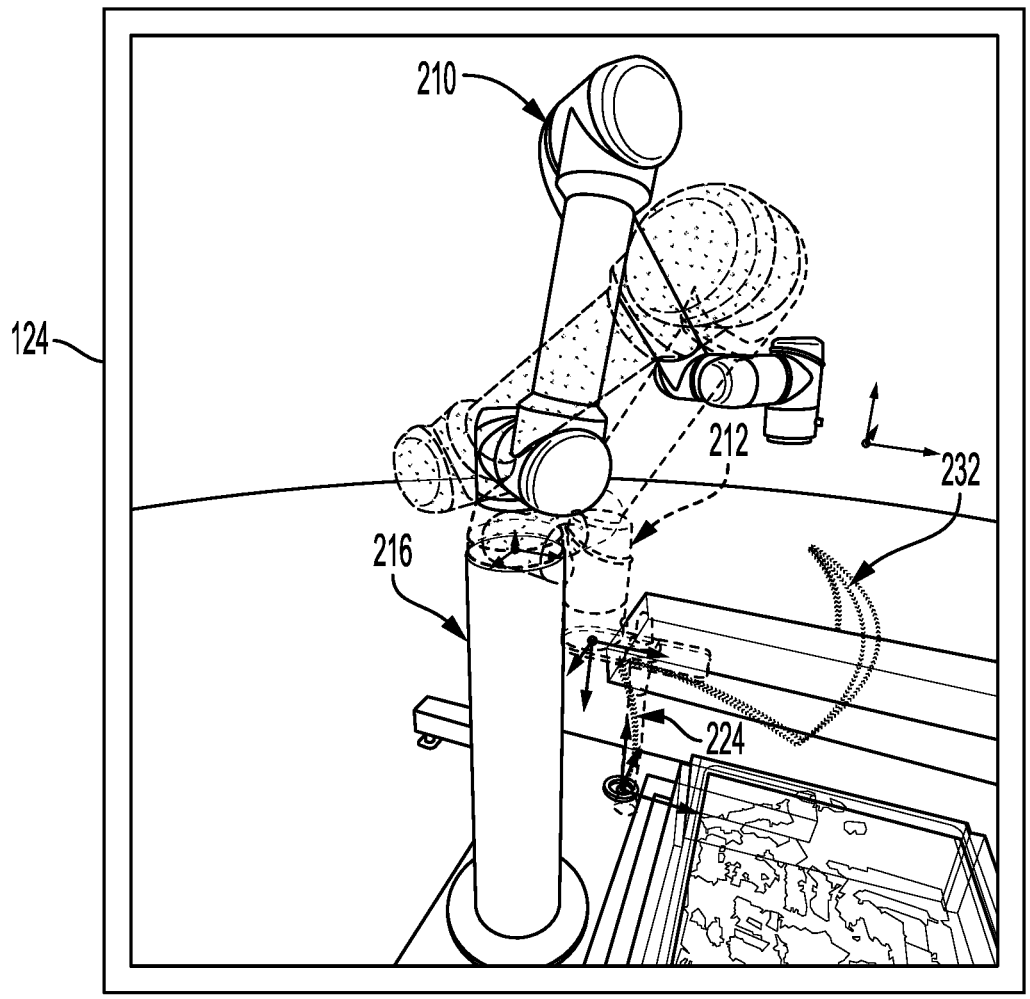
FIG. 11 illustrates an example of the GUI with additional collision detections illustrated, according to an example implementation.

FIG. 11 illustrates an example of the GUI 124 with additional collision detections illustrated, according to an example implementation. In FIG. 11, self-collisions and exceeding a maximum joint angle difference is shown by offending joints changing color (e.g., turning red) on the transparent representation 212. The simulated possible movement of the robot 200 is shown on the GUI 124 with the dotted lines 232 showing movement of the end effector 224.

Within further examples, the method 400 can optionally include providing haptic feedback applied to a controller at the operator station based on movement of the robot to perform the target pose. The controller can include a joystick or computer mouse, for example, haptic feedback can be applied based on a simulated collision being detected.

Still further, following execution of movement of the robot, observations of the movement can be captured to provide feedback. Thus, within some examples, the method 400 can include receiving, at the computing device 122, captured audio characteristics of movement of the robot at the robot station when performing the target pose, and providing haptic feedback applied to a controller at the operator station based the captured audio characteristics of movement of the robot to perform the target pose. In this example, if a collision occurred, audio from the collision can be provided to the operator through a speaker at the operator station.

Figure 12:
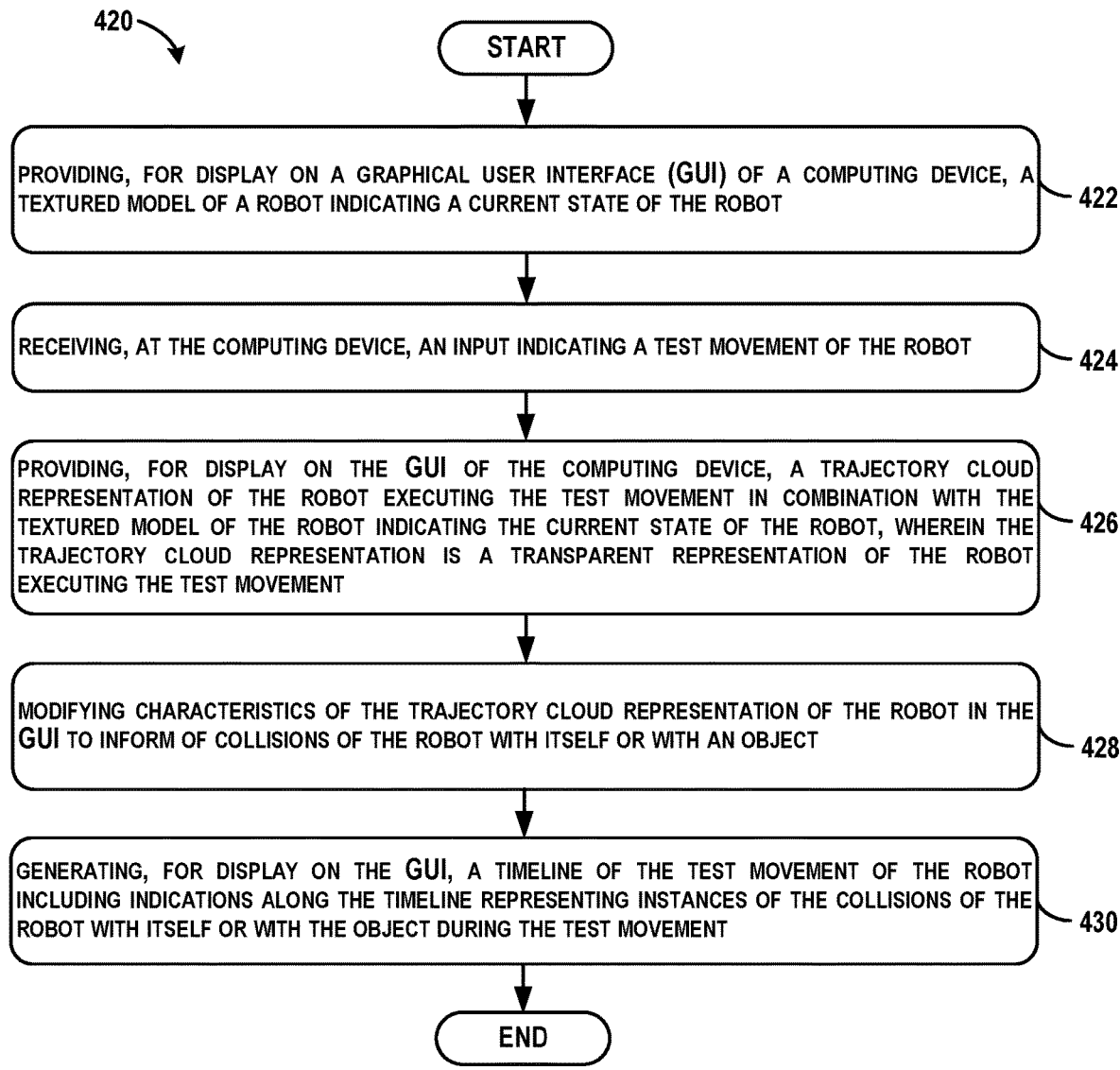
FIG. 12 shows a flowchart of another example of a computer-implemented method, according to an example implementation.

FIG. 12 shows a flowchart of another example of a computer-implemented method 420, according to an example implementation. Method 420 shown in FIG. 12 presents an example of a method that could be used with the robots 102a-b, robot 200, system 300, or computing device 122 shown in FIGS. 1-3, for example. Further, devices or systems may be used or configured to perform logical functions presented in FIG. 12. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 420 may include one or more operations, functions, or actions as illustrated by one or more of blocks 422-430. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 12, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 422, the method 420 includes providing, for display on a graphical user interface (GUI) of a computing device, a textured model of a robot indicating a current state of the robot. At block 424, the method 420 includes receiving, at the computing device, an input indicating a test movement of the robot. Functions of blocks 422 and 424 may be the same or similar to functions described with respect to blocks 402 and 404 of FIG. 4.

In FIG. 12, at block 426, the method 420 includes providing, for display on the GUI of the computing device, a trajectory cloud representation of the robot executing the test movement in combination with the textured model of the robot indicating the current state of the robot, and the trajectory cloud representation is a transparent representation of the robot executing the test movement. The trajectory cloud representation illustrates sequential movement of the robot over time in increments, and each illustrated increment remains for display as a subsequent increment for display is generated and illustrated.

At block 428, the method 420 includes modifying characteristics of the trajectory cloud representation of the robot in the GUI to inform of collisions of the robot with itself or with an object. Example modifications can be the same or similar to those as described with functions in block 410 in FIG. 4.

In FIG. 12, at block 430, the method 420 includes generating, for display on the GUI, a timeline of the test movement of the robot including indications along the timeline representing instances of the collisions of the robot with itself or with the object during the test movement. The indications illustrate and indicate when an invalid pose or movement of the robot occurred.

Figure 13:
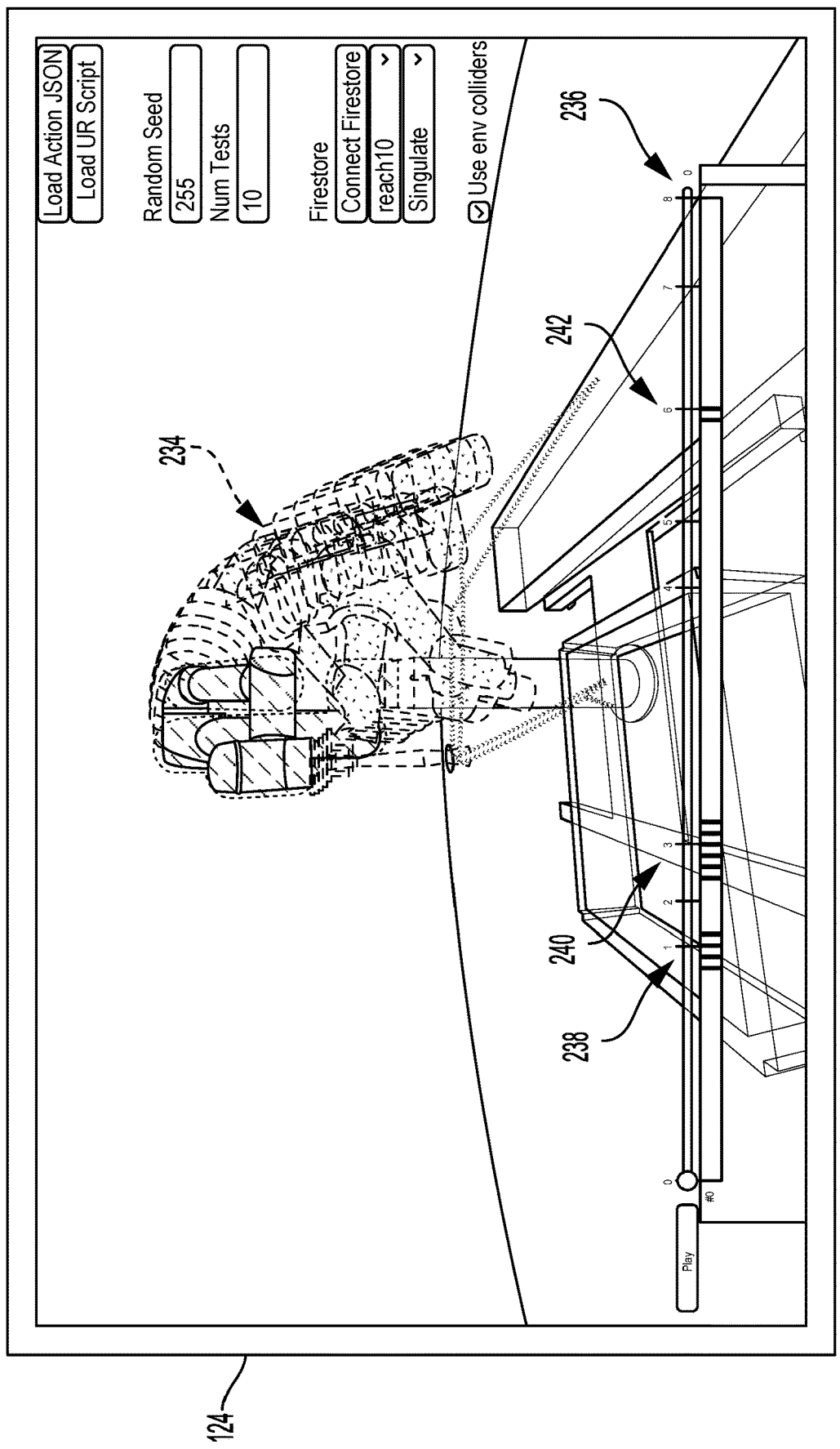
FIG. 13 illustrates an example of the GUI with the trajectory cloud representation and timeline of the test movement, according to an example implementation.

FIG. 13 illustrates an example of the GUI 124 with the trajectory cloud representation and timeline of the test movement, according to an example implementation. In FIG. 13, the trajectory cloud representation 234 of the robot 200 is shown as a preview of the test movement, and the trajectory cloud representation 234 is semi-transparent. Portions of the trajectory cloud representation 234 that have modified characteristics, e.g., change in color to red, illustrate poses or movement that is invalid or results in a collision with an object or another portion of the robot.

A timeline 236 is provided on the GUI 124 and indications 238, 240, and 242 are marked on the timeline 236 to note instances of the invalid poses or movement, or other collisions. The GUI 124 thus enables the operator to test safety of the robot 200 by inputting test actions for simulation against a given set of target poses so as to identify whether any safety system is triggered.

In some examples, the method 420 thus includes performing a simulation of the test movement, and based on detection of the collisions of the robot with itself or with the object during the simulation of the test movement, generating modifications to the characteristics of the trajectory cloud representation of the robot in the GUI.

As further examples, the method 420 in FIG. 12 enables testing of a safety system of the robot. For example, test movement and actions for the robot and environment objects (that can result in collisions) can be loaded from cloud storage into the computing device 122, and simulated triggered collisions during a program are shown as the indications 238, 240, and 242 (e.g., red tick marks) along the timeline 236. This enables testing of the safety system of the robot to ensure that the robot performs as desired for a simulated collision.

Thus, in further examples, the method 420 includes retrieving from data storage a limit of a range of motion of the robot and environment collisions, performing a simulation of the test movement, and detecting the collisions of the robot with itself or with the object during the simulation of the test movement.

In other examples, the method 420 includes applying the test movement against a set of boundary conditions in an environment of the robot, identifying whether a safety system of the robot has been triggered, and based on identifying that the safety system of the robot has been triggered, generating modifications to the characteristics of the trajectory cloud representation of the robot in the GUI.

Examples described herein enable the computing device 122 to provide operator feedback when controlling the robot. The GUI provides visualizations illustrating to the operators of valid/invalid poses and trajectories during real-time interactive control of a remotely controlled robot. This teaches operators the kinematics of the robots, and also prevents damage to the robot and its surroundings.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
providing, for display on a graphical user interface (GUI) of a computing device, a textured model of a robot indicating a current state of the robot, wherein the computing device is at an operator station and is configured to teleoperate the robot, and wherein the robot is at a robot station;
receiving, at the computing device, an input indicating a target pose of the robot;
providing, for display on the GUI of the computing device, a transparent representation of the robot as a preview of the target pose in combination with the textured model of the robot indicating the current state of the robot;
generating a boundary illustration on the GUI having a substantially spherical shape that represents a limit of a range of motion of the robot based on a maximum boundary of movement of the robot, wherein the boundary illustration includes one or more characteristics that visually change as the robot approaches the limit of the range of motion, wherein the one or more characteristics of the boundary illustration includes an opacity having an intensity, and wherein the intensity of the opacity is highest from a point on the boundary illustration located closest to the robot, and the intensity decreases radiating away from the point on the boundary illustration;
based on the target pose extending the robot beyond the boundary illustration, modifying characteristics of the transparent representation of the robot and of the boundary illustration on the GUI to inform of an invalid pose; and
based on the target pose being a valid pose, sending instructions to the robot causing the robot to perform the target pose.

2. The method of claim 1, wherein modifying the characteristics of the transparent representation of the robot and of the boundary illustration on the GUI to inform of the invalid pose comprises:
changing a color of the transparent representation of the robot and of the boundary illustration on the GUI.

3. The method of claim 1, wherein the robot comprises a base, a center column extending upward from the base, multiple arm components connected in a serial connection through coupling links providing multiple degrees of freedom, wherein one of the multiple arm components is coupled to the center column, and an end effector connected to a last one of the arm components in the serial connection, wherein the boundary illustration is a first boundary illustration on the GUI representative of the limit of the range of motion of the multiple arm components, and wherein the method further comprises:
generating a second boundary illustration on the GUI extending upward from the center column representative of a limit of a range of motion of the one of the multiple arm components coupled to the center column.

4. The method of claim 1, wherein the robot is positioned in an environment, and the method further comprises:
receiving, from one or more vision components in the environment, vision data that captures features of the environment, including object features of an object that is located in the environment; and
generating a transparent representation of the object on the GUI illustrating a location of the object in the environment with respect to the robot.

5. The method of claim 4, further comprising:
- simulating a possible movement of the robot on the GUI to achieve the target pose from the current state of the robot;
- based on detection of a collision with the object in the environment by the robot simulating the possible movement, generating on the GUI a representation of a trajectory path of the robot simulating the possible movement resulting in the collision; and
- generating a representation on the GUI illustrating the collision.

6. The method of claim 5, further comprising:
- based on the collision being acceptable, modifying characteristics of the representation on the GUI illustrating the collision to inform of acceptable movement of the robot.

7. The method of claim 4, further comprising:
- simulating a possible movement of the robot on the GUI to achieve the target pose from the current state of the robot; and
- based on detection of a collision with the object in the environment by the robot simulating the possible movement, generating on the GUI a representation of a trajectory path of the robot simulating the possible movement as a series of lines with arrows indicating movement direction resulting in the collision.

8. The method of claim 1, further comprising:
- simulating a possible movement of the robot on the GUI to achieve the target pose from the current state of the robot; and
- based on detection of a collision of the robot with a portion of the robot simulating the possible movement, modifying characteristics of the transparent representation of the robot.

9. The method of claim 1, wherein the robot comprises a base, a center column extending upward from the base, multiple arm components connected in a serial connection through coupling links providing multiple degrees of freedom, wherein one of the multiple arm components is coupled to the center column, and an end effector connected to a last one of the arm components in the serial connection, and wherein the method further comprises:
- simulating a possible movement of the robot on the GUI to achieve the target pose from the current state of the robot; and
- based on exceeding a maximum joint angle of one of the multiple arm components of the robot simulating the possible movement, modifying characteristics of the one of the multiple arm components on the transparent representation of the robot.

10. The method of claim 1, further comprising:
- receiving, at the computing device, captured audio characteristics of movement of the robot at the robot station when performing the target pose; and
- providing haptic feedback applied to a controller at the operator station based on the captured audio characteristics of movement of the robot to perform the target pose.

11. A non-transitory computer readable medium having stored thereon instructions, that when executed by one or more processors of a computing device, cause the computing device to perform functions comprising:
- providing, for display on a graphical user interface (GUI) of the computing device, a textured model of a robot indicating a current state of the robot, wherein the computing device is at an operator station and is configured to teleoperate the robot, and wherein the robot is at a robot station;
- receiving an input indicating a target pose of the robot;
- providing, for display on the GUI of the computing device, a transparent representation of the robot as a preview of the target pose in combination with the textured model of the robot indicating the current state of the robot;
- generating a boundary illustration on the GUI having a substantially spherical shape that represents a limit of a range of motion of the robot based on a maximum boundary of movement of the robot, wherein the boundary illustration includes one or more characteristics that visually change as the robot approaches the limit of the range of motion, wherein the one or more characteristics of the boundary illustration includes an opacity having an intensity, and wherein the intensity of the opacity is highest from a point on the boundary illustration located closest to the robot, and the intensity decreases radiating away from the point on the boundary illustration;
- based on the target pose extending the robot beyond the boundary illustration, modifying characteristics of the transparent representation of the robot and of the boundary illustration on the GUI to inform of an invalid pose; and
- based on the target pose being a valid pose, sending instructions to the robot causing the robot to perform the target pose.

12. The non-transitory computer readable medium of claim 11, wherein the robot is positioned in an environment, and the functions further comprise:
- receiving, from one or more vision components in the environment, vision data that captures features of the environment, including object features of an object that is located in the environment; and
- generating a transparent representation of the object on the GUI illustrating a location of the object in the environment with respect to the robot.

13. The non-transitory computer readable medium of claim 12, wherein the functions further comprise:
- simulating a possible movement of the robot on the GUI to achieve the target pose from the current state of the robot;
- based on detection of a collision with the object in the environment by the robot simulating the possible movement, generating on the GUI a representation of a trajectory path of the robot simulating the possible movement resulting in the collision; and
- generating a representation on the GUI illustrating the collision.

14. The non-transitory computer readable medium of claim 12, wherein the functions further comprise:
- simulating a possible movement of the robot on the GUI to achieve the target pose from the current state of the robot; and
- based on detection of a collision with the object in the environment by the robot simulating the possible movement, generating on the GUI a representation of a trajectory path of the robot simulating the possible movement as a series of lines with arrows indicating movement direction resulting in the collision.

15. The non-transitory computer readable medium of claim 11, wherein the functions further comprise:

receiving captured audio characteristics of movement of the robot at the robot station when performing the target pose; and providing haptic feedback applied to a controller at the operator station based the captured audio characteristics of movement of the robot to perform the target pose.

16. A system comprising:

one or more processors; and a non-transitory computer readable medium having stored thereon instructions, that when executed by the one or more processors, causes the one or more processors to perform functions comprising:

providing, for display on a graphical user interface (GUI), a textured model of a robot indicating a current state of the robot, wherein the system is at an operator station and is configured to teleoperate the robot, and wherein the robot is at a robot station;

receiving an input indicating a target pose of the robot;

providing, for display on the GUI, a transparent representation of the robot as a preview of the target pose in combination with the textured model of the robot indicating the current state of the robot;

generating a boundary illustration on the GUI having a substantially spherical shape that represents a limit of a range of motion of the robot based on a maximum boundary of movement of the robot, wherein the boundary illustration includes one or more characteristics that visually change as the robot approaches the limit of the range of motion, wherein the one or more characteristics of the boundary illustration includes an opacity having an intensity, and wherein the intensity of the opacity is highest from a point on the boundary illustration located closest to the robot, and the intensity decreases radiating away from the point on the boundary illustration;

based on the target pose extending the robot beyond the boundary illustration, modifying characteristics of the transparent representation of the robot and of the boundary illustration on the GUI to inform of an invalid pose; and based on the target pose being a valid pose, sending instructions to the robot causing the robot to perform the target pose.

17. The system of claim 16, wherein the robot is positioned in an environment, and the functions further comprise:

receiving, from one or more vision components in the environment, vision data that captures features of the environment, including object features of an object that is located in the environment; and generating a transparent representation of the object on the GUI illustrating a location of the object in the environment with respect to the robot.

18. The system of claim 17, wherein the functions further comprise:

simulating a possible movement of the robot on the GUI to achieve the target pose from the current state of the robot; and based on detection of a collision with the object in the environment by the robot simulating the possible movement, generating on the GUI a representation of a trajectory path of the robot simulating the possible movement resulting in the collision; and generating a representation on the GUI illustrating the collision.

19. A method comprising:

providing, for display on a graphical user interface (GUI) of a computing device, a textured model of a robot indicating a current state of the robot, wherein the GUI is configured to display a conceptual substantially spherical boundary representing a limit of a range of motion of the robot relative to the current state of the robot, wherein the conceptual substantially spherical boundary includes one or more characteristics that visually change as the robot approaches the limit of the range of motion, wherein the conceptual substantially spherical boundary includes an opacity having an intensity, and wherein the intensity of the opacity is highest at a point of the conceptual spherical boundary located closest to the robot and the intensity of the opacity decreases in directions radiating away from the point of the conceptual spherical boundary;

receiving, at the computing device, an input indicating a test movement of the robot;

providing, for display on the GUI of the computing device, a trajectory cloud representation of the robot executing the test movement while simultaneously displaying the textured model of the robot indicating the current state of the robot, wherein the trajectory cloud representation is a transparent representation of the robot executing the test movement;

modifying characteristics of the trajectory cloud representation of the robot in the GUI to inform of collisions of the robot with itself or with an object; and generating, for display on the GUI, a timeline of the test movement of the robot including indications along the timeline representing instances of the collisions of the robot with itself or with the object during the test movement.

20. The method of claim 19, further comprising:

performing a simulation of the test movement; and based on detection of the collisions of the robot with itself or with the object during the simulation of the test movement, generating modifications to the characteristics of the trajectory cloud representation of the robot in the GUI.

21. The method of claim 19, further comprising:

retrieving from data storage a limit of a range of motion of the robot and environment collisions;

performing a simulation of the test movement; and detecting the collisions of the robot with itself or with the object during the simulation of the test movement.

22. The method of claim 19, further comprising:

applying the test movement against a set of boundary conditions in an environment of the robot;

identifying whether a safety system of the robot has been triggered; and based on identifying that the safety system of the robot has been triggered, generating modifications to the characteristics of the trajectory cloud representation of the robot in the GUI.

* * * * *